March 11, 1952     H. W. HOUSEWEART     2,588,927
MILK CAN COOLER
Filed May 11, 1949     2 SHEETS—SHEET 1
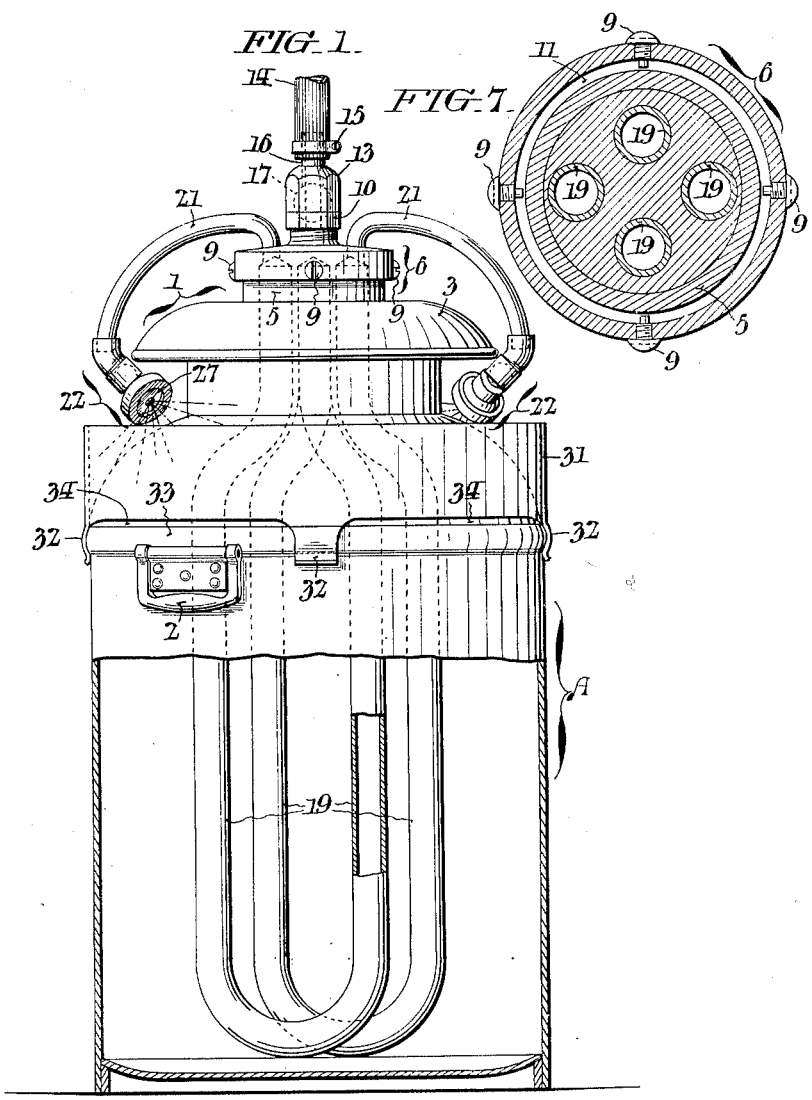
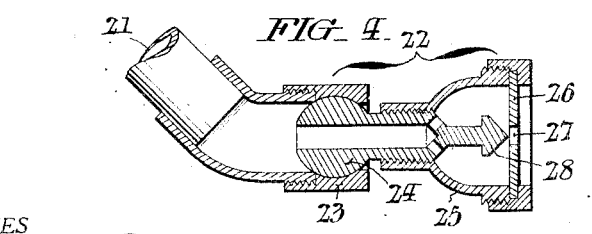
INVENTOR:
Harold W. Houseweart.
BY Paul & Paul
ATTORNEYS.

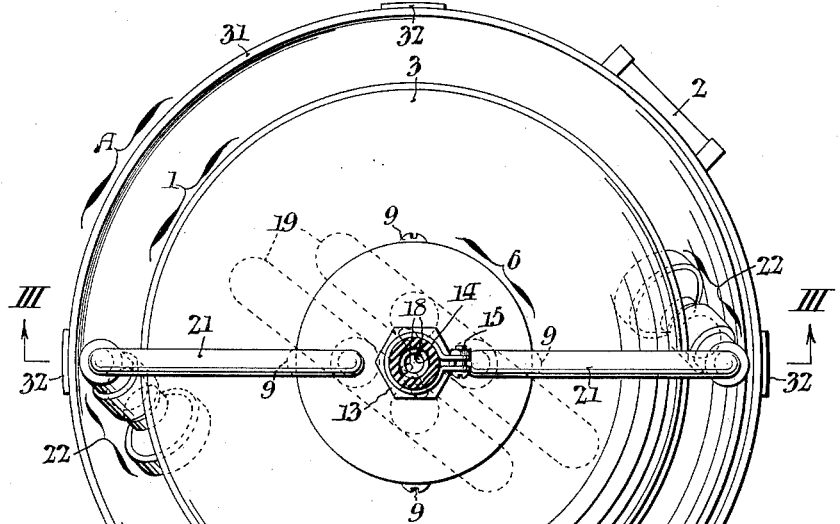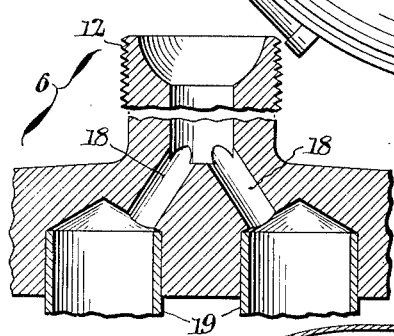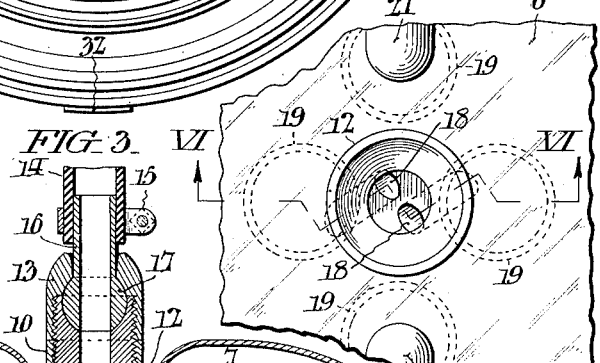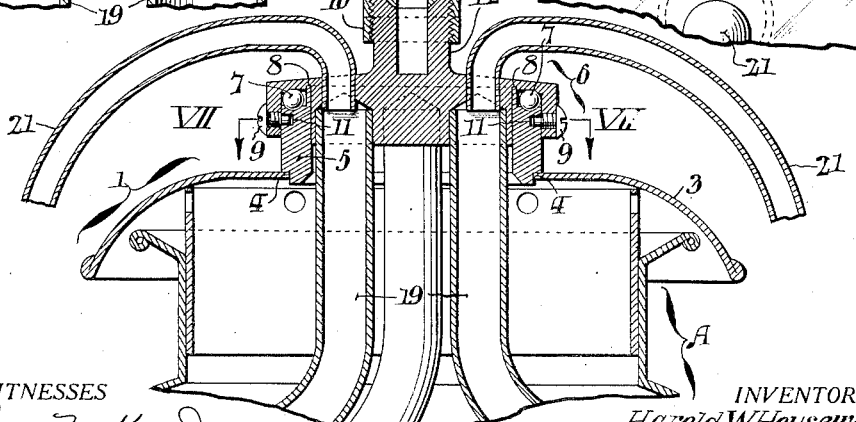

Patented Mar. 11, 1952

2,588,927

UNITED STATES PATENT OFFICE 2,588,927

MILK CAN COOLER

Harold W. Houseweart, Benton, Pa.

Application May 11, 1949, Serial No. 92,723

3 Claims. (Cl. 257—74)

This invention relates to a milk can cooler and more particularly to a device which is adapted for ready attachment to the lid of a conventional form of milk can and which, when so applied, will cause a supply of cooling fluid to be circulated through and discharged against the exterior of the milk can to lower the temperature of the milk.

Heretofore various schemes have been proposed for cooling milk cans and I am aware that attempts have been made to utilize cold water under pressure, both as a cooling medium and as a means of incidentally agitating the milk to hasten the cooling process. Such schemes have proved to be impracticable, unsatisfactory or uneconomical, for a variety of reasons. In some instances such cooling devices have involved the use of a turbine or a motor driven agitator or equally complicated and expensive apparatus for agitating the milk while cooling it. In other cases skeleton frames have been provided at the top of a can for supporting the rotating mechanism and such structures have involved parts which are relatively inaccessible for cleaning with the result that the device is cumbersome, expensive and unsanitary.

The principal object of the present invention is to overcome the problems indicated above and to provide a cooling attachment which serves efficiently to cool the contents of a milk can, utilizing the pressure of the cooling fluid to effect the desired agitation, and yet consists of a small number of parts of such design that the attachment may be readily applied to a conventional form of can, and is inexpensive to manufacture, assemble and operate.

A further object of the invention is to provide in a cooling attachment of the character described a unitary cooling head carrying the complete conduit for the cooling fluid and constructed in such manner that it is adapted to be fitted to a conventional form of milk can lid. In this manner my invention utilizes to the fullest advantage equipment which is readily available and requires in addition to the normal parts of a milk can only a relatively small, compact cooling head, together with tubes which are free of exposed joints or places which are likely to become contaminated or are difficult of access for cleaning.

A further object of the invention is to provide in such apparatus adjustable discharge nozzles which cause the cooling fluid to impinge directly on the exterior of the can, as well as to circulate through the milk, and which may be manipulated to secure optimum results under different conditions of water pressure etc.

Other more specific objects and advantages, including the benefits derived from simplicity, will become more fully apparent from the description of an embodiment of the invention which follows hereinafter, having reference to the accompanying drawings. Of the drawings:

Fig. 1 represents a side elevation of a milk can with a cooling attachment of this invention applied thereto, the lower portion of the can being broken away to reveal interior details;

Fig. 2 represents a top plan view of the same;

Fig. 3 represents an enlarged vertical cross section of the top of the can, taken as indicated by the arrows III—III of Fig. 2;

Fig. 4 represents an enlarged sectional view of one of the spraying nozzles showing the details of its construction;

Fig. 5 represents a fragmentary plan view of the cooling head forming part of the cooling attachment;

Fig. 6 represents a transverse vertical staggered sectional view of the same, taken as indicated by the arrows VI—VI in Fig. 5; and Fig. 7 represents a plan sectional view of the cooling head, taken as indicated by the arrows VII—VII in Fig. 3.

In the drawings a conventional milk can is comprehensively designated at A. The can includes a lid 1 formed in a usual manner, except for modifications which are hereinafter explained, and handles 2 at opposite sides.

The top of the lid 1 includes an umbrella-shaped covering element 3 of a generally well known design which has a central circular opening 4 to which is fitted the novel cooling attachment of this invention. Rigidly affixed to the covering element 3 at the opening 4 is a supporting element 5 of generally cylindrical shape which carries the entire assembly of revolving parts and tubes constituting the cooling attachment.

Mounted for rotation on the fixed supporting element 5 is a cooling head 6 which forms a cap for the opening in the top of the lid 1, closing the opening in such manner as to prevent the entrance of any foreign matter into the interior of the can. Between the fixed supporting element 5 and the cooling head is a bearing consisting of balls 7 which permits the cooling head to rotate freely with a minimum of friction. Inwardly of the balls 7 an upstanding annular flange 8 is formed on the fixed supporting element 5 and this flange engages in an annular groove formed at the underside of the cooling head to provide an effective seal between these parts. In order to maintain the cooling head in its proper position set screws 9 are provided, the inner ends of these screws fitting in an annular groove 11 in the outer cylindrical wall of the fixed supporting element 5, and preventing separation of the revolving parts from the stationary parts without removal of the set screws.

Integrally formed with the cooling head 6 at the top thereof is an inlet tube 12 which is exteriorly threaded and engaged by a nut-shaped member 13 which is held in place by a lock nut 10. The source of cooling fluid, in the illustrated example, consists of a rubber hose 14 secured by a clamp 15 to a nipple 16 having a spherical lower end 17 fitting within similarly formed surfaces in the nut-shaped member 13 and the inlet tube 12. It will be apparent that a swivel union is thus provided between the source of cooling fluid and the inlet tube 12 of the cooling head 6, and that whereas the hose 14 and nipple 16 are stationary the inlet tube 12 and nut-shaped member 13 are free to rotate as a result of the pressure under which the cooling fluid is admitted and by reason of the special design of the cooling head as more fully explained hereinafter.

Water or other cooling fluid passing through the hose 14 and nipple 12 strikes angled passages 18 formed at the base of the inlet tube 12 see Figs. 2, 5 and 6, and flows through these passages to the underside of the cooling head where circular recesses are formed which accommodate the ends of stirrer tubes 19. In the illustrated embodiment of the invention two stirrer tubes 19 are utilized, each being of a generally U-shaped configuration extending substantially to the bottom of the milk can A, the tube sections being spread laterally and spaced from each other in such manner as to stir the contents of the can throughout the body thereof and at the same time to permit easy cleaning of the tubes. It will be noted that the stirrer tubes are devoid of joints or crevices in which particles of milk may accumulate and are so designed that it is a simple matter to wipe all parts thereof so that the cooling apparatus may be maintained in a thoroughly sanitary condition.

At their outlet ends the tubes 19 are fitted in circular recesses in the underside of the cooling head 6 and communicate with exterior discharge tubes 21 which join the cooling head through circular openings in the top thereof. Each discharge tube 21 extends upwardly and then downwardly over the lid 1 and terminates in a nozzle 22 which is directed inwardly against the exterior of the can.

As best shown in Fig. 4, each discharge nozzle 22 has a swivel connection with the discharge tube 21 with which it is associated, such connection including a threaded sleeve 23 having a spherically shaped nipple 24 seated therein. The nipple 24 is in threaded engagement with a terminal fitting 25 having a disc 26 with an orifice 27 therein. The nipple 24 has restrictive passages therein and carries a conical tip 28 in the rear of the orifice 27 regulating the character of the spray issuing from the discharge nozzle. By adjustment of the various parts of the discharge nozzle 22 the spray can be regulated so that it impinges upon the body of the milk can in a generally downward direction and so that the stream fans outwardly from the orifice as desired.

In order to prevent splashing of the cooling fluid in the vicinity of the discharge nozzles 22, a cylindrical shield 31 is provided, the shield surrounding the upper part of the can below the lid and being removably secured to the can by means of depending spring clips 32 engaging an annular boss 33 near the top of the can. Between the spring clips 32 the shield is cut away, as indicated at 34, providing slots through which the water or other cooling fluid can drain downwardly over the milk can, thus preventing an accumulation of water within the shield, and causing a gradual flow of the fluid over the entire exterior of the milk can, thereby gaining the maximum cooling effect.

It will be observed that rotary motion is imparted to the cooling head 6 by two different forces. First, by reason of the passages 18 being angled relatively to the direction of flow of the cooling fluid through the inlet tube 12, an impulse is created at the point where the fluid strikes the walls of the restrictive angled passages, such impulse tending to cause rotation of the cooling head, see Figs. 5 and 6. Secondly, the formation and disposition of the discharge tubes 21, the discharge nozzles 22 at the ends thereof, and the restrictive passages through which the cooling fluid flows as it issues therefrom are such that a reactive force is created which also tends to cause rotation of the cooling head 6. It is found that the combination of these forces is sufficient, when the cooling head is mounted on ball bearings in the manner illustrated, to impart rotary motion to the cooling head and the parts associated therewith even with the comparatively low pressures encountered at the usual outlets where cold water is available.

An important advantage of the apparatus of this invention is that it can be readily connected to cold water outlets such as are available on numerous farms, and it can be operated without requiring any other source of power, utilizing only the pressure of the cooling water to effect rotation of the stirrer tubes. Moreover, the flow of water through the interior of the can, with incidental stirring, and the further cooling effect of the spray at the exterior of the can makes possible efficient cooling even though the temperature of the cooling water is not far below atmospheric temperature.

It will also be apparent that a further important advantage of the form of cooling attachment described and claimed herein is that it is of a unitary, compact nature, the inlet tubes, stirrer tubes and discharge tubes all being carried by a cooling head which in turn is supported on the lid of a milk can in such manner that no change is required in the general design of the milk can and its lid, other than punching an opening in the top thereof, and no additional foundation or framework is required to furnish support to the moving parts. Thus the attachment is extremely simple to manufacture, assemble and operate and at the same time it serves efficiently to cool a milk can.

Although I have described my invention by reference to one embodiment thereof, it will be apparent to those skilled in the art that changes may be made in the particular form of the milk can and its lid, and in the form of the cooling attachment specifically described and illustrated herein, including reversals of parts and substitutions of equivalent mechanisms, and that certain features of the invention may be used to advantage without use of other features, all without departing from the spirit of the invention as defined in the annexed claims.

Having thus described my invention, I claim:

1. A milk can cooler in the form of a unitary attachment constructed for ready insertion into and withdrawal from a standard milk can, comprising a fixed supporting element in the form of a standard cap for a milk can provided with an opening, a cooling head rotatably mounted in said opening, a cooling tube fixed to said cooling head and extending into the body of the can for rotary stirring motion therein, an outlet conduit for the coolant from said cooling tube, an inlet conduit for fluid coolant under pressure, and an angled walled passage enclosed in said cooling head directly connecting said inlet conduit to said cooling tube, said angled walled passage being disposed at an angle to the path of flow of the incoming coolant and to the axis of rotation of the cooling head whereby the incoming coolant is directed against said wall creating an impulse and thereby rotating the angled passage, cooling head and attached cooling tube to concurrently stir and cool the liquid in the can.

2. A milk can cooler in the form of a unitary attachment constructed for ready insertion into and withdrawal from a standard milk can, comprising a fixed supporting element in the form of a standard cap for a milk can provided with an opening, a cooling head rotatably mounted in said opening, an inlet conduit for carrying coolant to said cooling head, a cooling tube fixed to said cooling head and extending into the body of the can, an angled walled passage enclosed in said cooling head directly connecting said inlet conduit to said cooling tube, said angled walled passage being disposed at an angle to the path of flow of the incoming coolant and at an angle to the axis of rotation of said cooling head whereby the incoming coolant is directed against the wall to exert an impulse in a definite direction thereby rotating the angled passage, cooling head and cooling tube in a definite direction, and an outlet conduit for the coolant from said cooling tube, said outlet conduit extending outwardly over the can and having a restricted end portion disposed at an angle to the axis of said cooling head to direct the discharged coolant along a line spaced from said axis in a direction creating a reactive force on said cooling head coacting with and acting in the same direction as the impulse force of the angled passage.

3. A milk can cooler in the form of a unitary attachment constructed for ready insertion into and withdrawal from a standard milk can, comprising a fixed supporting element in the form of a standard cap for a milk can provided with a central opening, a cooling head rotatably mounted in said opening, U-shaped cooling tubes fixed to said cooling head and extending in spaced-apart relation into the body of the can, outlet conduits for the coolant from the cooling tubes, an inlet conduit for fluid coolant, and angled walled passages all enclosed in said cooling head each directly connecting said inlet conduit to one of said cooling tubes, the number of U-shaped cooling tubes being equal to the number of outlet conduits and to the number of angled walled passages, each of said angled passages being disposed at an angle to the path of flow of the incoming coolant, and to the axis of rotation of said cooling head, whereby the incoming coolant is directed against each of said walls creating additive impulse forces and thereby rotating the angled passages and cooling head.

HAROLD W. HOUSEWEART.

REFERENCES CITED

The following references are of record in the file of this patent:

UNITED STATES PATENTS

| Number | Name | Date |
| --- | --- | --- |
| 113,690 | Northrop | Apr. 11, 1871 |
| 1,402,545 | Springborn | Jan. 3, 1922 |
| 1,759,578 | Kelso | May 20, 1930 |
| 1,874,541 | Jonsson | Aug. 30, 1932 |
| 1,930,227 | Donahue | Oct. 10, 1933 |
| 1,984,581 | Hasselberg | Dec. 18, 1934 |
| 2,048,078 | Moore | July 21, 1936 |
| 2,189,146 | Little | Feb. 6, 1940 |
| 2,217,379 | Peardon | Oct. 8, 1940 |
| 2,281,499 | Herzbrun et al. | Apr. 28, 1942 |

FOREIGN PATENTS

| Number | Country | Date |
| --- | --- | --- |
| 812,283 | France | Feb. 1, 1937 |